United States Patent
Schuss et al.

(10) Patent No.: US 11,600,922 B2
(45) Date of Patent: Mar. 7, 2023

(54) DUAL BAND FREQUENCY SELECTIVE RADIATOR ARRAY

(71) Applicant: RAYTHEON COMPANY, Waltham, MA (US)

(72) Inventors: Jack J. Schuss, Newton, MA (US); Phillip W. Thiessen, Wellesley, MA (US); Thomas V. Sikina, Acton, MA (US)

(73) Assignee: RAYTHEON COMPANY, Waltham, MA (US)

( * ) Notice: Subject to any disclaimer, the term of this patent is extended or adjusted under 35 U.S.C. 154(b) by 395 days.

(21) Appl. No.: 16/786,881

(22) Filed: Feb. 10, 2020

(65) Prior Publication Data
US 2021/0249771 A1    Aug. 12, 2021

(51) Int. Cl.
| | | |
|---|---|---|
| *H01Q 5/40* | (2015.01) | |
| *G01S 7/03* | (2006.01) | |
| *H01Q 15/00* | (2006.01) | |
| *H01Q 21/06* | (2006.01) | |

(52) U.S. Cl.
CPC ............. *H01Q 5/40* (2015.01); *G01S 7/032* (2013.01); *H01Q 15/0013* (2013.01); *H01Q 21/065* (2013.01)

(58) Field of Classification Search
CPC .......... H01Q 5/40; H01Q 15/00; H01Q 21/06; G01S 7/03
See application file for complete search history.

(56) References Cited

U.S. PATENT DOCUMENTS

| | | |
|---|---|---|
| 3,293,646 A | 12/1966 | Brueckmann |
| 3,641,579 A | 2/1972 | Voronoff |
| 3,691,562 A | 9/1972 | Parker et al. |
| 4,434,425 A | 2/1984 | Barbano |
| 4,450,449 A | 5/1984 | Ewitt |
| 4,509,056 A | 4/1985 | Ploussios |
| 4,912,481 A | 3/1990 | Mace et al. |

(Continued)

FOREIGN PATENT DOCUMENTS

GB    2 268 335 A    1/1994

OTHER PUBLICATIONS

Invitation to Pay Additional Fees and, Where Applicable, Protest Fee from corresponding International Patent Application No. PCT/US2021/013314, Invitation to Pay Additional Fees dated Apr. 16, 2021 (10 pgs.).

(Continued)

*Primary Examiner* — Andrea Lindgren Baltzell
(74) *Attorney, Agent, or Firm* — Lewis Roca Rothgerber Christie LLP

(57) ABSTRACT

A dual band frequency selective radiator array includes a high band radiator array disposed on a dielectric layer for transmitting and receiving high band radar signals; a low band radiator array disposed on a front side of the high band radiator array for transmitting and receiving low band radar signals; a frequency selective surface (FSS) tuned to the high band radar signals forming a surface of the low band radiator array and passes the high band radar signals to the high band radiator array; and a single aperture disposed in front of the low band radiator array, the high band radiator array and the FSS for both the low band radiator array and the high band radiator array for transmitting and receiving the radar signals.

11 Claims, 9 Drawing Sheets

(56) References Cited

U.S. PATENT DOCUMENTS

| | | |
|---|---|---|
| 5,087,922 A | 2/1992 | Tang et al. |
| 5,208,603 A | 5/1993 | Yee |
| 5,949,387 A | 9/1999 | Wu et al. |
| 6,121,931 A * | 9/2000 | Levi .................. H01Q 5/42 |
| | | 343/846 |
| 6,201,509 B1 | 3/2001 | Zhang et al. |
| 6,211,841 B1 | 4/2001 | Smith et al. |
| 6,252,559 B1 | 6/2001 | Donn |
| 6,426,730 B1 | 7/2002 | Nishizawa et al. |
| 6,452,549 B1 * | 9/2002 | Lo .................. H01Q 21/064 |
| | | 343/756 |
| 6,795,020 B2 | 9/2004 | Sreenivas et al. |
| 8,282,632 B2 | 10/2012 | Rossetto |
| 8,922,445 B2 | 12/2014 | Ngo Bui Hung |
| 8,923,924 B2 | 12/2014 | Reinhardt et al. |
| 9,083,076 B2 | 7/2015 | Parsche |
| 10,014,592 B2 | 7/2018 | Chien |
| 2006/0232479 A1 | 10/2006 | Walton |
| 2016/0365645 A1 | 12/2016 | Bisiules |
| 2018/0301801 A1 | 10/2018 | Hojjat et al. |

OTHER PUBLICATIONS

International Search Report for corresponding International Application No. PCT/US2021/013314, filed Jan. 13, 2021, International Search Report dated Apr. 8, 2021 and mailed Jun. 11, 2021 (7 pgs.).
Written Opinion of the International Searching Authority for corresponding International Application No. PCT/US2021/013314, filed Jan. 13, 2021, Written Opinion of the International Searching Authority dated Jun. 11, 2021 (10 pgs.).
International Search Report for related International Application No. PCT/US2021/013313, filed Jan. 13, 2021, International Search Report dated Apr. 8, 2021 and mailed Apr. 16, 2021 (5 pgs.).
Written Opinion of the International Searching Authority for related International Application No. PCT/US2021/013313, filed Jan. 13, 2021, Written Opinion of the International Searching Authority mailed Apr. 16, 2021 (8 pgs.).

* cited by examiner

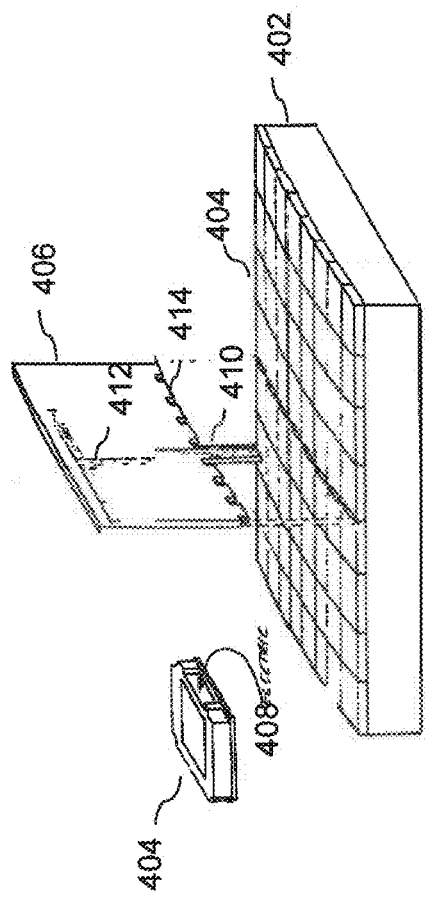

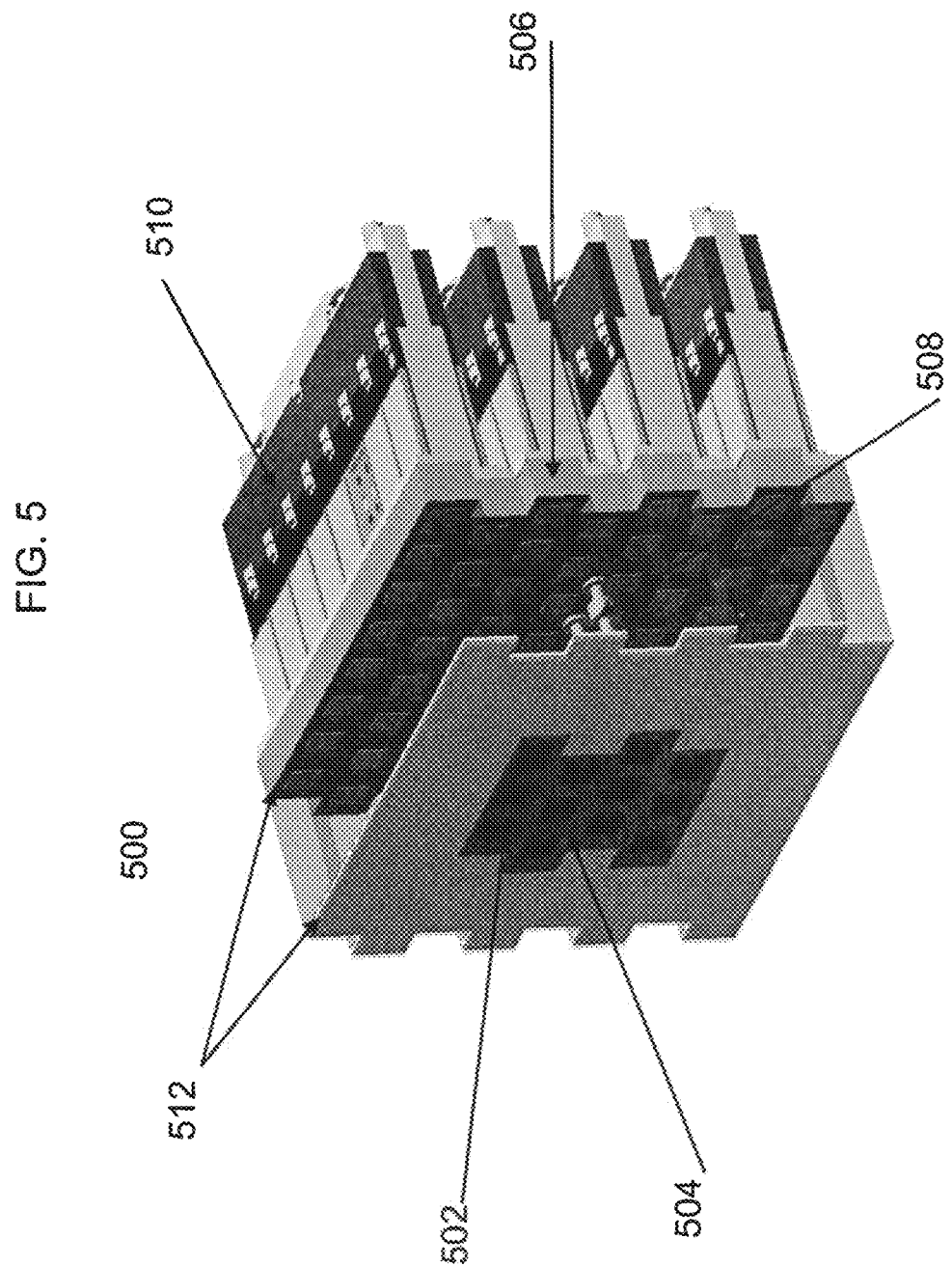

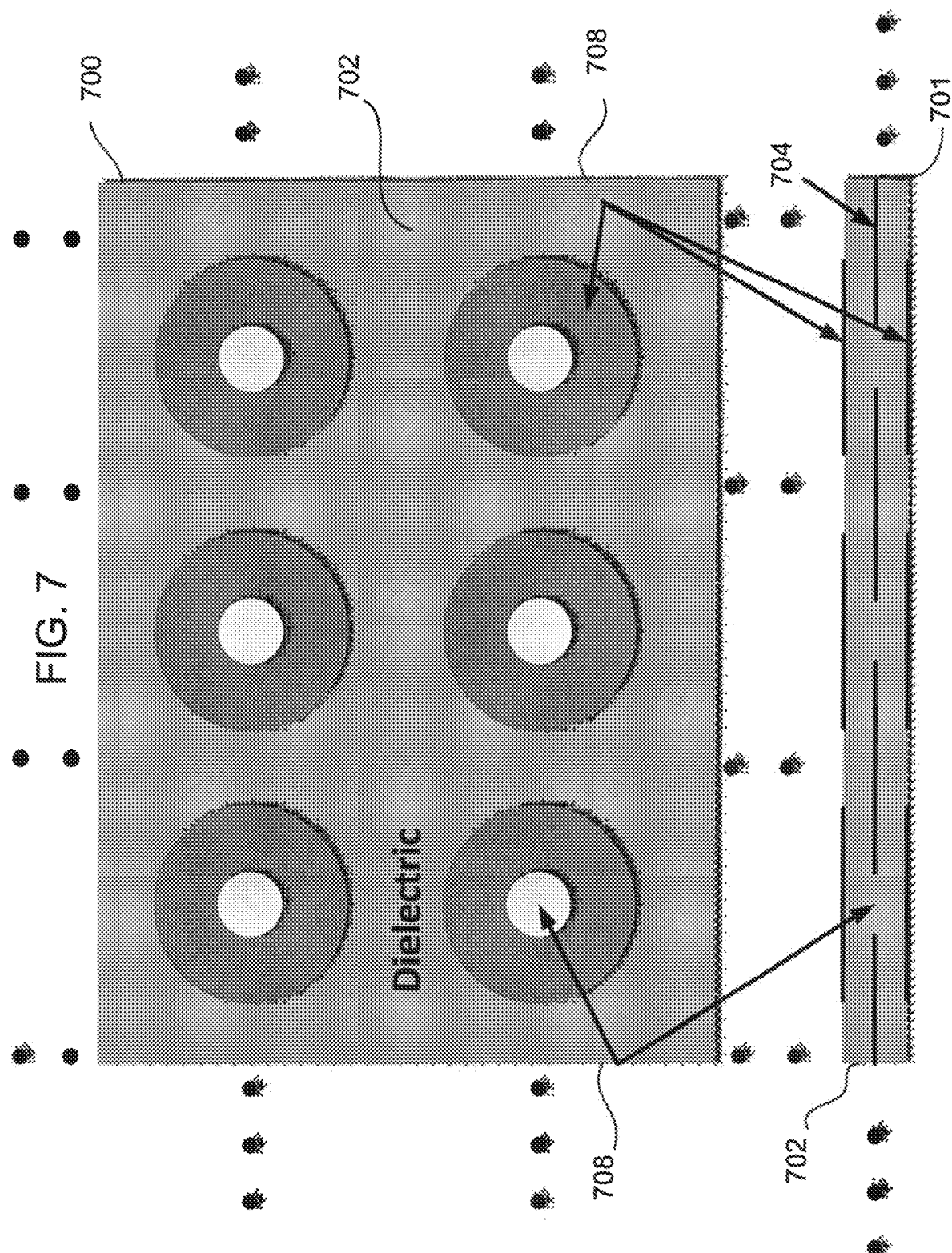

DUAL BAND FREQUENCY SELECTIVE RADIATOR ARRAY

FIELD OF THE INVENTION

The present invention relates generally to phased array antenna design and more specifically to dual band frequency selective radiator arrays.

BACKGROUND

An antenna array is a group of multiple connected antennas coupled to a common source or load to act as a single antenna and produce a directive radiation pattern. Usually, the spatial relationship of the individual antennas also contributes to the directivity of the antenna array. FIG. 1 shows a diagram of one embodiment of a conventional antenna array 100. The antenna array 100 includes several linear arrays 104 housed in a (non-metallic) radome 102 that includes an aperture area for receiving and transmitting signals. Here, each linear array 104 is arranged vertically with equal spacing between each other, which is determined by the wavelength of the desired operating frequency of the antenna array 100. Each linear array 104 is connected to its associated radio frequency (RF) electronics circuitry contained in an external RF electronics module 108, via an antenna feed 106. The RF electronics module 108 is connected to external systems via a connection 110 for power, control, and communications connections; and may be physically mounted within the radome 102, or may be located remotely or outside of the antenna array 100.

An Electronically Scanned Array (ESA) is a type of phased array antenna, in which transceivers include a large number of solid-state transmit/receive modules. In ESAs, an electromagnetic beam is emitted by broadcasting radio frequency energy that interferes constructively at certain angles in front of the antenna. An active electronically scanned array (AESA) is a type of phased array antenna whose transmitter and receiver (transceiver) functions are composed of numerous small solid-state transmit/receive modules (TRMs) or components. AESA antennas aim their beam by emitting separate radio waves from each module that are phased shifted or time delayed so that waves interfere constructively at certain angles in front of the antenna.

Typically, the basic building block of a conventional AESA is the Transmit/Receive module or TR module, which can be packaged to form an AESA antenna element, and may include a radiator to create a specific radiation pattern, receiver Low Noise Amplifier (LNA), transmit Power Amplifier (PA), and digitally controlled phase or delay and gain components. Several of these TR modules are placed on antenna panels in a grid format for transmitting and receiving radar signals. Digital control of the transmit/receive gain and phase allows an AESA antenna to steer or point the resultant antenna beam without physically moving the antenna panel. Typical modern-day low cost AESA antenna panels employ printed circuit or patch radiators connected to surface mount Monolithic Microwave Integrated Circuit (MMIC) devices that contain the LNA, PA and phase/gain control circuitry, which can be situated on a single printed circuit board (PCB).

Typically, antenna arrays are designed in a platform or housing that must be sized for specific frequency and gain by tailoring the structural elements of the platform for the specific frequency band. For example, larger antenna elements are needed for lower frequencies and smaller antenna elements are required for higher frequencies, while increasing the number of antenna elements is necessary to increase the antenna gain. However, the antenna platform is generally a fixed structure and typically cannot be modified to accommodate such changes or improvements in the design and therefore is not capable of easy adjustment of the frequency range and gain since they are generally fixed in the structure. Additionally, since these antenna arrays are specifically built for the specified frequency, gain, polarization, beam width, and other requirements, the lead time to make any design changes or performance improvements is very long.

FIG. 2 illustrates a typical architecture of a conventional radar antenna array. As shown, a plurality of power and beamforming building blocks 204/206 are arranged in an array 200 in rows and columns. Each building block 206 may include a number of transmit/receive integrated multi-channel module (TRIMM) cards and their associated power and signals electronics cards including, for example 24 TRIMMs, a synthesizer card, a DREX (Digital Receiver Exciter) card, and an auxiliary power controller card. As a result, these designs require new unique radiator and array structure and back structure for each radar frequency band and cannot be easily upgraded in performance and size at a later date without extensive rework. The power and beamforming network for each block (of 24 TRIMMs) would require extensive modification to the existing power, signal and thermal management systems to add additional modular building blocks to a previously existing antenna system.

Some challenging radar applications require a radar that simultaneously operates at two frequency bands, where the two frequency bands are separated by at least an octave. Unfortunately, such a radar often requires two independent apertures, and its cost and size are comparable to that of two radars. The two apertures also make transporting the radar difficult due to its size for tactical missions. Some conventional methods use a wideband element on a single aperture, that covers both bands. However, this has the disadvantage of requiring a small lattice and a large number of modules at the low band, since the element lattice needs to be sized for scan at the high frequency band. The wide operating bandwidth also introduces Signal-to-Noise Ratio (SNR) limitations and intermodulation complexities.

SUMMARY

In some embodiments, the disclosed invention is a dual band frequency selective radiator array that includes a high band radiator array disposed on a dielectric layer for transmitting and receiving high band radar signals; a low band radiator array disposed on a front side of the high band radiator array for transmitting and receiving low band radar signals; a frequency selective surface (FSS) tuned to the high band radar signals forming a surface of the low band radiator array and passes the high band radar signals to the high band radiator array; and a single aperture disposed in front of the low band radiator array, the high band radiator array and the FSS for both the low band radiator array and the high band radiator array for transmitting and receiving the radar signals.

In some embodiments, the low band radiator array includes: top radiator metal patches formed and spaced apart on a dielectric substrate; bottom radiator metal patches formed and spaced apart on the dielectric substrate; and a metal ground plane including openings formed in the dielectric substrate, wherein a spacing of the top radiator patches and a spacing of the bottom radiator patches are aligned with each other, and wherein each opening covers entire spacings of corresponding top and bottom radiator patches. In some embodiments, the FSS behaves as a metal film at low band frequencies so that the low band radiators do not interfere with high frequency transmit or receive radar signals

BRIEF DESCRIPTION OF THE DRAWINGS

These and other features, aspects, and advantages of the present invention will become better understood with regard to the following description, appended claims, and accompanying drawings.

FIG. 4 illustrates an exemplary low band dipole board mounted on a high band radiator array, according to some embodiments of the disclosed invention.

FIG. 5 depicts an exemplary dual band patch radiator array with an FSS, according to some embodiments of the disclosed invention.

FIG. 7 depicts an exemplary structure for high band patch radiators, according to some embodiments of the disclosed invention.

DETAILED DESCRIPTION

In some embodiments, the disclosed invention is a dual band frequency selective radiator array for radar applications, wherein a low band radiator array is placed in front of a high band radiator array with both radiator arrays sharing a common radar aperture. In some embodiments, a low band patch radiator array having an outer frequency selective surface (FSS) is tuned to a high band and being placed over or in front of a high band patch radiator array. The FSS on the surface of the low band patch radiator array passes the high band frequency to the underlying high band patch radiators. In some embodiments, the dual band radiator array achieves a low sidelobe performance in both bands with about 60-degree conical scan volume. In some embodiments, a feed-through connection between the low band radiators and the T/R modules via the high band array provides the signal feeds. This way, the radar can then efficiently support dual band operation without having two apertures and without a very expensive wideband array that uses multi-octave radiators. In some embodiments, the dual-band radiator array is modular at the sub-array level.

In some embodiments, a low band folded dipole structure/element is disposed within a foam block over a high band patch radiator array, where the dipole structure includes stubs tuned to pass high band frequencies through to the underlying high band radiator array, for example tuned to open circuit the dipole at the high band. Because of this the dipole radiators have low RF scattering cross sections at the high band frequencies to reduce the coupling between the dual bands. The two apertures/phased arrays operate (in both transmit and receive modes) simultaneously by making the low frequency aperture transparent to the high frequency RF radiation.

In some embodiments, low band patch radiators are placed in front of the high band phased array. The low band patch radiators are made transparent to the high band RF by placing a frequency selective surface (FSS) on their surfaces. The FSS geometrical features are integrated into the low band coupled patch radiators, so that they are transparent to the high band, but behave as a metal plate at the low band.

In some embodiments, the low band radiators are dipole structures, which are made transparent to the high band RF by incorporating tuned stubs or RF chokes, tuned for the high band. The tuned stubs or RF chokes break up the dipoles into small segments at the high band frequencies, thereby making the dipoles transparent to the high band RF signals.

Figure 1:
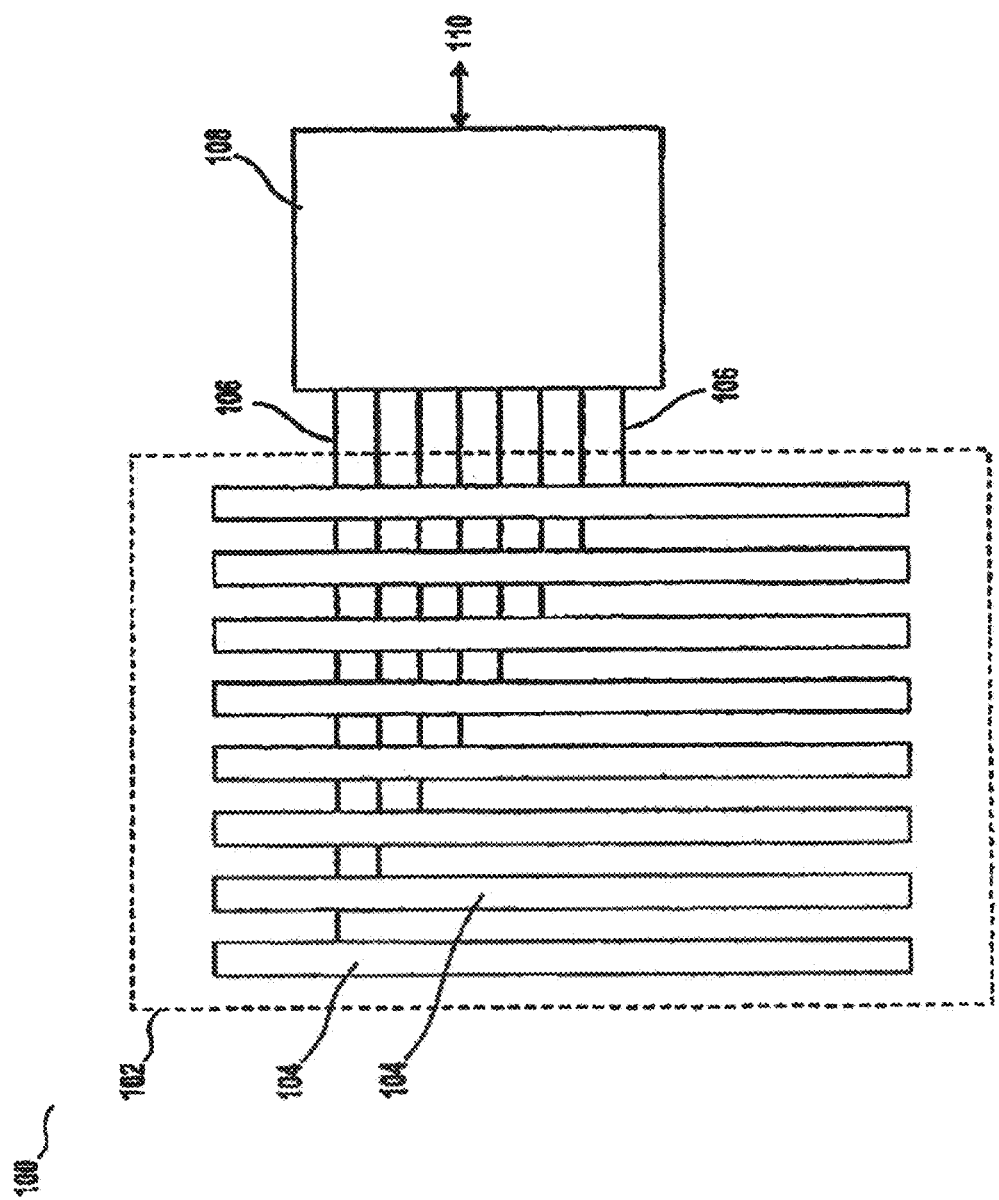
FIG. 1 shows a diagram of a conventional antenna array.
Figure 2:
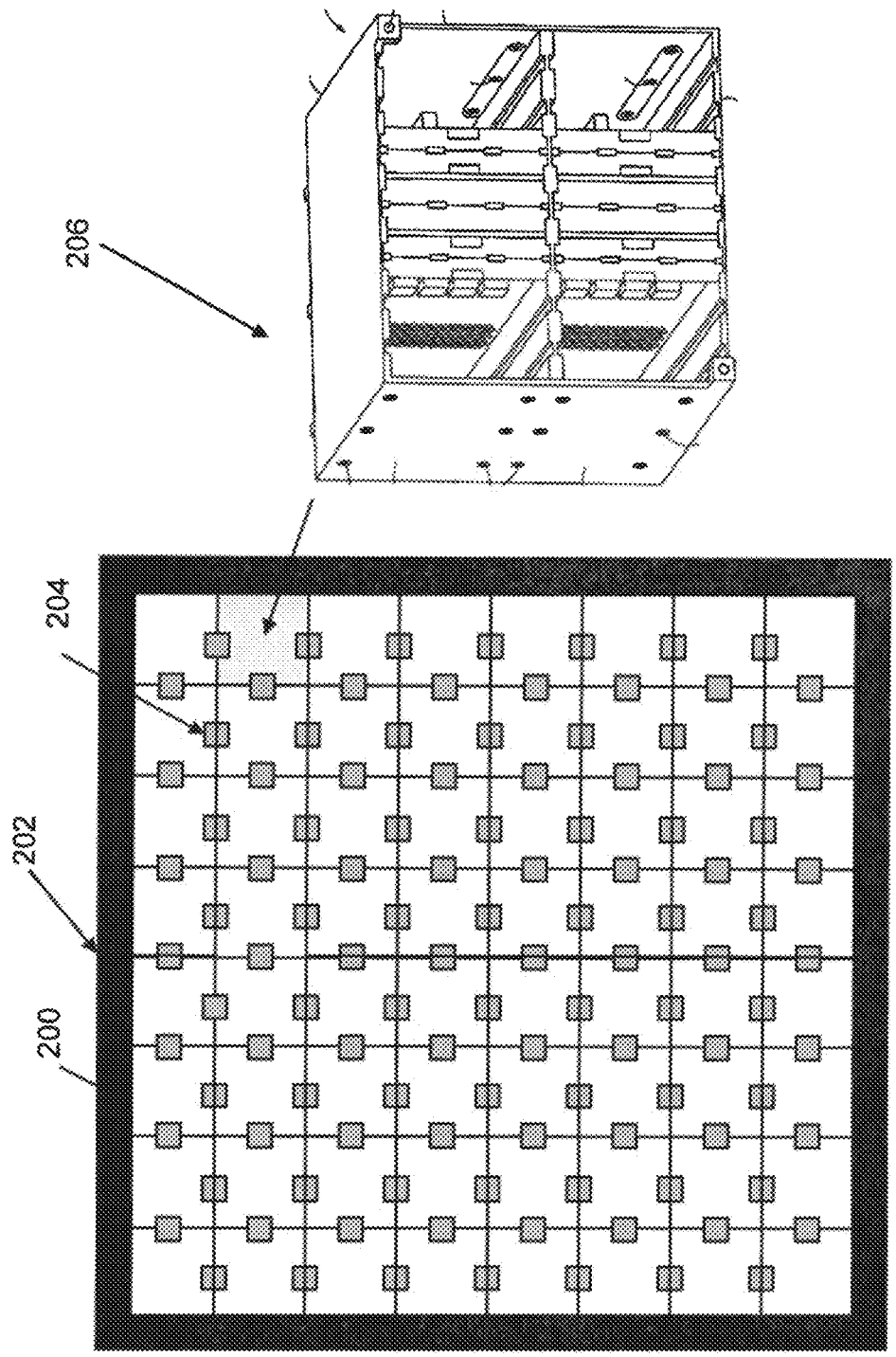
FIG. 2 illustrates a typical architecture of a conventional radar antenna array.
Figure 3:
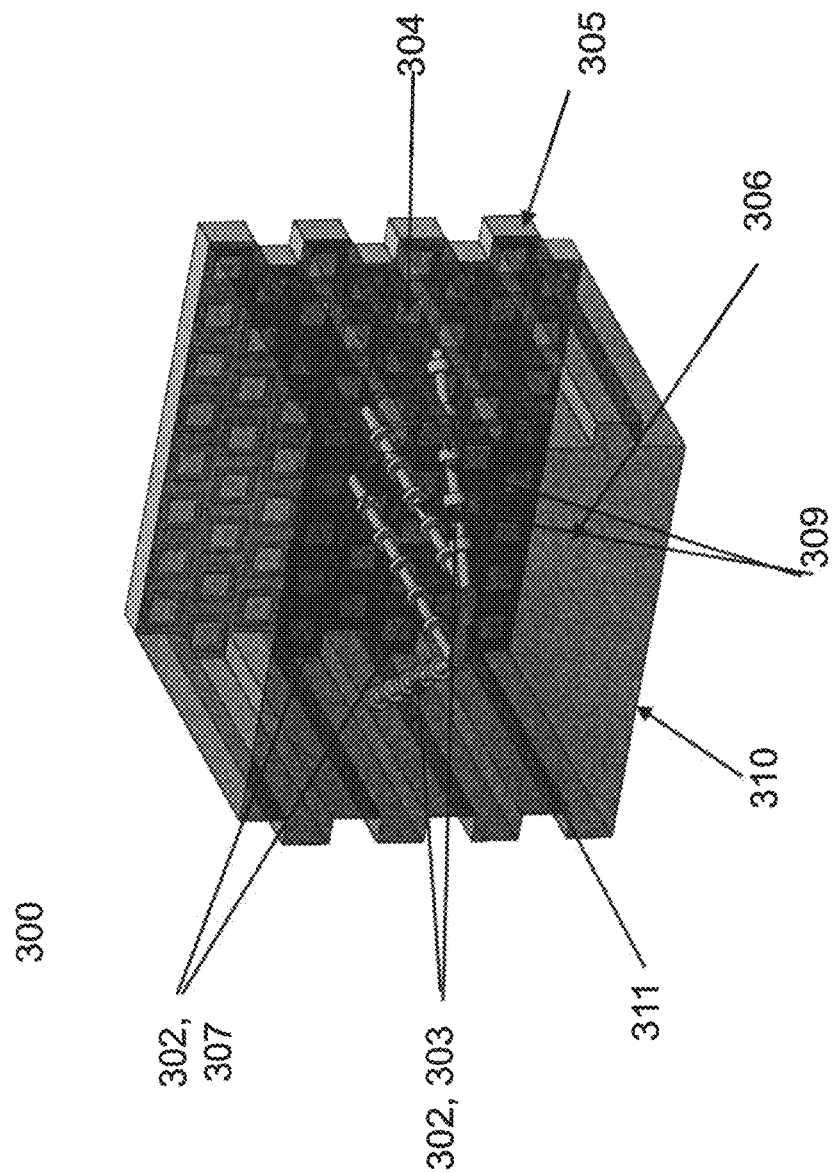
FIG. 3 depicts a subset of an exemplary dual band dipole radiator array, according to some embodiments of the disclosed invention.

FIG. 3 depicts an exemplary dual band dipole radiator array 300, according to some embodiments of the disclosed invention. As shown, a high band patch radiator array 304 is disposed on a dielectric layer 305 to form the back of the dual band radiator array. A low band dipole radiator array 302 is disposed on or in front of the high band radiator array 304 in a foam structure 306 that supports the low band radiator arrays. These low band element feeds include a coaxial line embedded inside one of the ribs/rods 307 of the dipole. At the end of the coaxial line, the center conductor is connected to a jumper strip 311, the other end of which is connected to the other rib/rod 307 of that dipole. This effectively excites the dipole at the low band frequencies, and is well known in the art. This coaxial line extents through the high band radiator array, and is typically connected to the output of a low band transmit/receive module located behind the array. The coaxial low band element feeds protrude through the high band patch radiator arrangement at their edges. This way, both the low band dipole radiator array 302 and the high band patch radiator array 304 share a single aperture/radome 310. In some embodiments, the high band patch radiators in the array 304 are formed on the dielectric layer 305 by a patch metal film.

In some embodiments, the low band dipole radiator array 302 includes supports 307, for example rods or ribs, that are substantially perpendicular to the plane of high band patch radiator array 304 and include chokes or electric stubs 309. Rods/ribs 307 may be composed of solid metal, and as described above may contain a coaxial line that connects a low band transmit/receive module to the low band dipole radiator. The low band dipole radiator array 302 also includes inclined rods/ribs 303 that are at angle to the plane of high band patch radiator array 304 and also include chokes or electric stubs 309. The low weight foam fills in the entire interior of the structure to provide a low weight support structure, acting like air for both frequency bands.

The low band dipole radiator array 302 generates a radiation pattern with a radiating structure supporting a line current so energized that the current has only one node at each end. In some embodiments, the dipole radiator array 302 includes two identical conductive elements such as metal wires or rods. The driving current is applied to these rods by the radar transmitter, and the input signal to the radar receiver is taken between the two halves of the dipole radiator, where each side of the feedline to the transmitter or receiver is connected to one of the conductors. In some embodiments, the low band dipole radiator is excited by the coaxial line embedded inside one of the ribs/rods 307, as described above.

In some embodiments, the low band dipole radiator array 302 includes an array of resonating stubs (309) located on the ribs or robs, for example, transmission line or waveguide that are connected at one end only and are tuned to an open circuit at low band frequencies. The input impedance of the stub may be modeled as capacitive or inductive, depending on the electrical length of the stub, and on whether it is open or short circuit and therefore they function as capacitors, inductors and resonant circuits at desired radio frequencies.

In some embodiments, the low band dipole radiator array 302 is composed of a series of (electronic) chokes (309) that act as an open circuit that blocks high band frequency currents, while passing low band frequency currents. By breaking up the high band frequency currents, the dipole is effectively broken up at the high band rf frequencies into a collection of small conductive RF scatterers, which greatly reduces its RF scattering cross section relative to a conventional dipole. This makes this low band dipole array largely invisible to the high band array, and permits a single aperture to have both high and low band frequency operation.

FIG. 4 illustrates an exemplary low band dipole board mounted on a high band radiator array, according to some embodiments of the disclosed invention. As shown, an array of high band (e.g., S-Band) patch radiators 404 are formed on a substrate 402. A plurality (only one is shown for simplicity) of low band (e.g., UHF) radiator printed circuit boards (boards) 406 are placed above the high band radiators as shown, one low band radiator for each group of high band radiators 404. In the example of FIG. 4, a group of 8×8 or 64 high band radiators are shown. Each radiator 404 includes a cut 408 to accommodate the teeth 414 of a corresponding radiator board 406. A foam support, as shown in FIG. 3, may also be included for mechanical support.

FIG. 5 depicts an exemplary dual band patch radiator array with an FSS, according to some embodiments of the disclosed invention. As shown, a low band patch radiator array 502 is disposed on or in front of a high band radiator array 506 by support structures 508, such as support ribs. A frequency selective surface (FSS) 504, which is tuned to the high band frequency is disposed over or in front of the low band patch radiator array 502 and the high band radiator array 506. The FSS 504 on the surface of the low band patch array 502 passes the high band frequency to the underlying high band patch radiators, so that the low band patch radiators do not interfere with the high band transmit or receive signals. However, the FSS behaves as a metal film at the low band frequencies so that the low band patch radiators operate as a conventional patch radiator array at the low band frequencies. The support structures 508 can be directly driven by RF signals or can contain an embedded coaxial cable to provide current to drive the low band patch radiators. This way, both the low band patch radiator array 502 and the high band patch radiator array 506 share a single aperture/radome 512. In some embodiments, support structures 508, for example ribs, may contain chokes tuned to the high band frequencies to make the ribs transparent to the high band radiator array. A low weight foam fills in the entire space between the low band patch radiator array 502 and the high band patch radiator array 506 to provide a low weight support structure, acting like air for the frequency bands.

In some embodiments, any thin, repetitive surface designed to reflect, transmit or absorb electromagnetic fields based on the frequency of the field may be used as the FSS 504. In some embodiments, the FSS is a type of optical filter or metal-mesh optical filters in which the filtering is accomplished by the regular, periodic pattern on the surface of the FSS. The optical filter or the pattern on the surface of the FSS 504 is designed to be tuned to the (high band) frequency of the high band radiator array 506.

Although, the low band radiators in FIG. 5 and the high band radiators in FIG. 3 are described as patch radiators, one skilled in the art would recognize that the radiators do not have to be patch radiators and other known methods of forming low band and high band radiators (other than patched radiators) are within the scope of the disclosed invention.

Figure 6A:
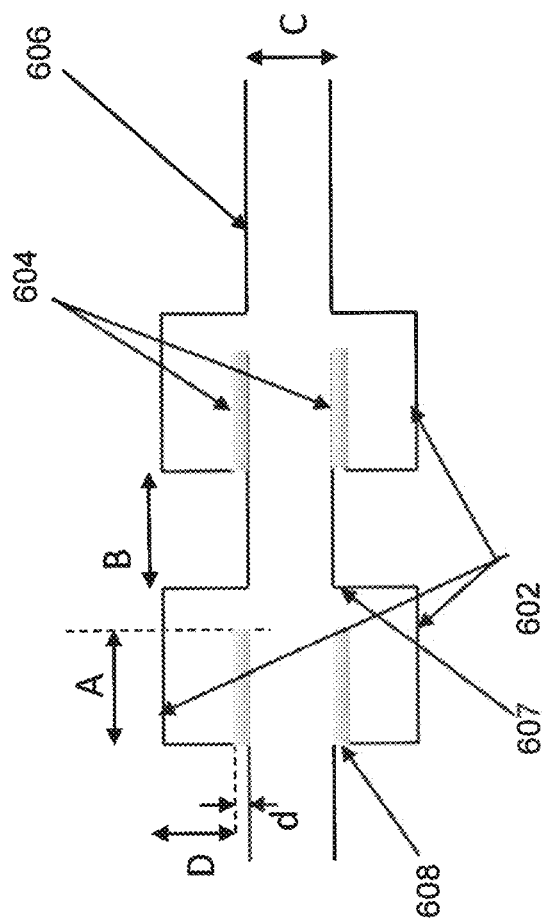
FIGS. 6A and 6B illustrate cross-sections of exemplary chokes, according to some embodiments of the disclosed invention.
Figure 6B:
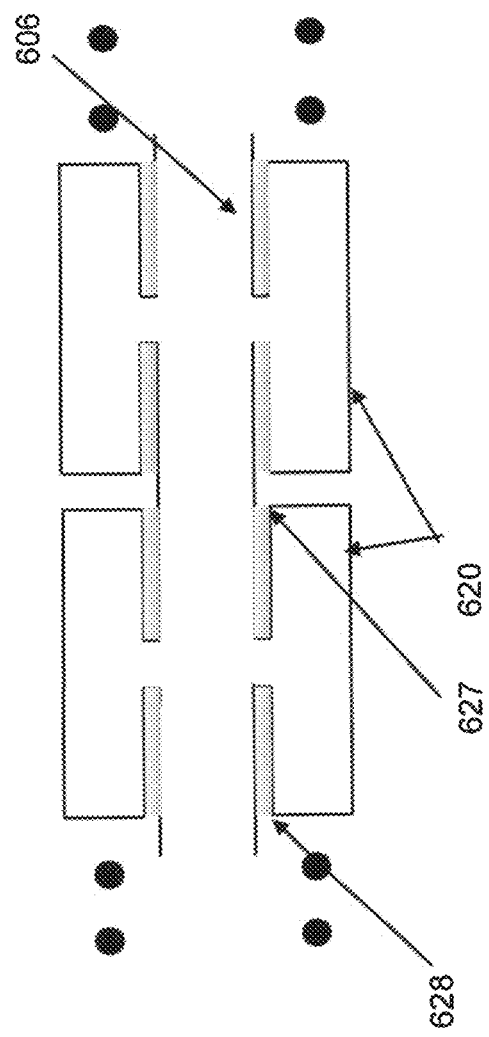

FIGS. 6A and 6B illustrate cross-sections of exemplary chokes, according to some embodiments of the disclosed invention. As shown, a plurality of chokes 602 are formed around a metal support 606 with a diameter of C, where the distance between each choke is shown as B. As shown in FIG. 6A, one end 607 of each choke 602 is connected to a metal support 606, for example, a rod/rib, while the other end 608 is left open. The open ends 608 include a dielectric layer 604 with a thickness of d and length of A that is shorter than the length of the chokes but fills the gap between the choke 602 and the metal support 606. In some embodiments, alternate chokes are mirror images of each other, namely the end 608 may face the end 608 of the adjacent choke, and the end 607 may face the end 607 of the other adjacent choke.

The chokes 602 have no or negligible effect for the low frequency band; however, they behave as open circuits for the high frequency band to pass high band frequencies through to the underlying high band radiator array.

In some embodiments as depicted in FIG. 6B, the chokes 620 are formed around a metal support 606, but are connected to the metal support 606 in their center, and include dielectric layer or inserts 627 and 628 at both ends of each choke 606.

Assuming that $\lambda$ is the wavelength of the high frequency band, the design parameters for the chokes are as follow:

$d \ll \lambda/4$ $A = \lambda/(4 * \varepsilon^{1/2})$ $D \ll \lambda/4$ $B \ll \lambda/4$, $C \ll \lambda/4$ consistent with power handling The design parameters D and C are selected as small (thin) as possible consistent with power handling of the radar system. However, B is selected as not being so small that the capacitance of the joint between adjacent chokes increases the RF conductance at the high band. In some embodiments, the chokes are cylindrical.

FIG. 7 depicts an exemplary top view 700 and an exemplary cross section view 701 of a frequency selective surface (FSS), according to some embodiments of the disclosed invention. As shown, upper and lower radiator (metal) patches 706 are formed and spaced apart on a dielectric substrate 702. The spacing of the upper radiator patches 706 and the spacing of lower radiator patches 706 on the dielectric substrate 702 correspond to (aligned with) each other, as depicted. Dielectric substrate 702 includes a metal ground plane 704. The metal ground plane 704 includes openings (apertures) 708, each covering the entire spacing of corresponding upper and lower radiator patches 706. The radiator patches 706 are excited by electromagnetic waves and start radiating, when the high frequency band is turned on. Note that the metal patches and the openings in the ground plane can be any shape, for example, round as shown in FIG. 7, square or the like.

Figure 8:
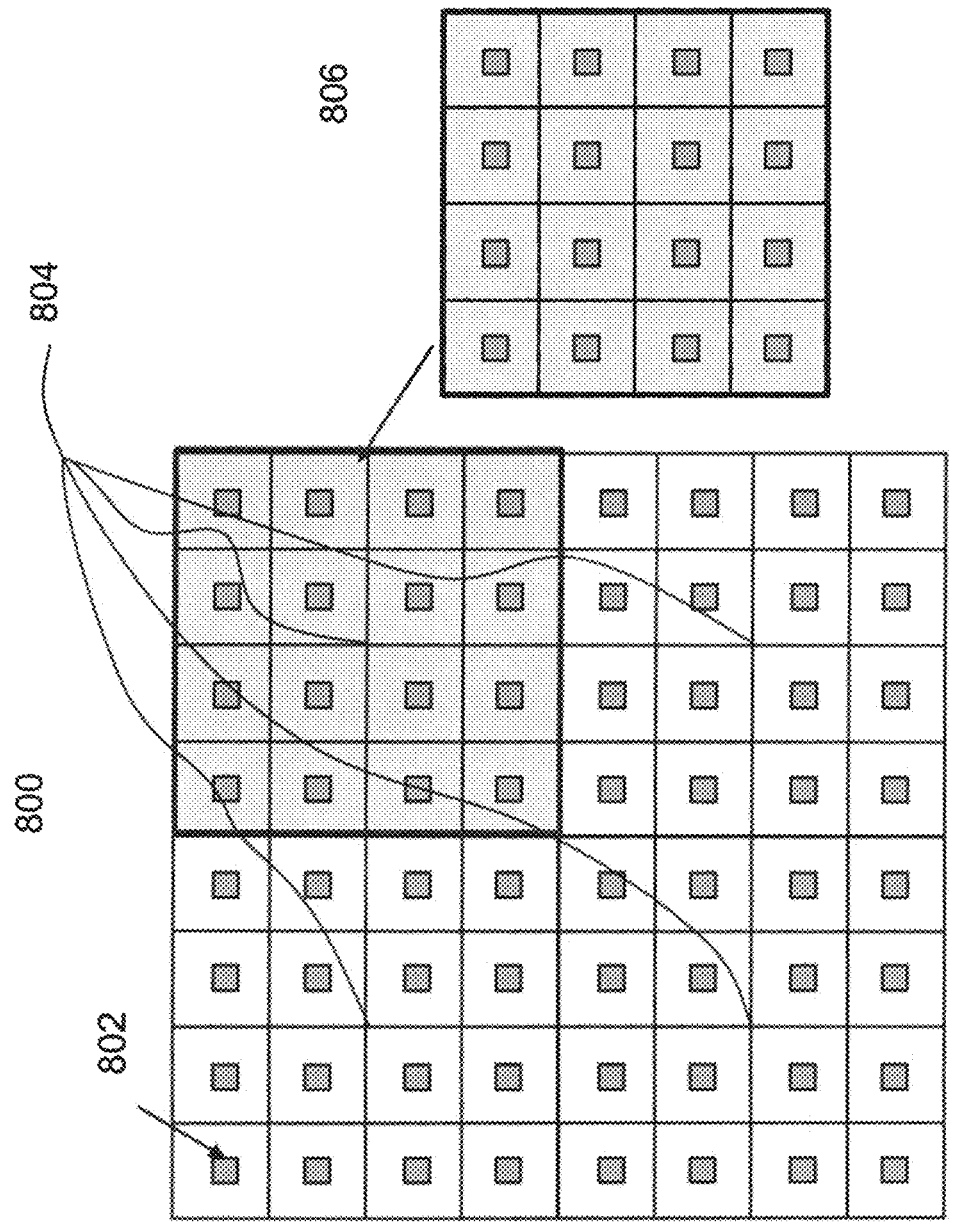
FIG. 8 illustrates an architecture of a modular and stackable antenna array, according to some embodiments of the disclosed invention.

FIG. 8 illustrates an architecture of a modular and stackable antenna array 800, according to some embodiments of the disclosed invention. As shown, the antenna array 800 includes four modular and stackable antenna array blocks 806. Each modular and stackable antenna array block 806 includes a plurality of antenna elements/radiators (for example, 802), as shown by the modular block 806). Each modular and stackable antenna array building block 806 may include a number of transmit/receive integrated multi-channel module (TRIMM) cards and their associated power and signals electronics cards that is a fully functional stand-alone radar antenna array, with its own self-supporting structure.

In some embodiments, the modular antenna structure and supporting electronics 802 reside within the volume behind the active antenna region 806, allowing one antenna array block to be stacked on top of, or next to, another antenna array block to create a single, larger monolithic antenna with no disruption of antenna array's lattice spacing. Power, cooling and beamforming 804 are connected in parallel to each modular antenna array block and therefore, eliminating the dependency of one antenna array block on the adjacent antenna array block.

The modular and stackable antenna blocks may be combined (e.g. stacked on, or placed next to) together to produce any desired size antenna array 800 and thus minimizing the initial investment costs while maintaining the ability to easily increase the size and sensitivity and thus capability of the antenna array, as required by different applications. Each modular and stackable antenna block operates the same regardless of the assembled array size. This way, additional antenna blocks can be added later without impact to the existing system's structure, support electronics or thermal management.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope of the invention as defined by the appended drawings and claims.

What is claimed is:

1. A dual band frequency selective radiator array for transmitting and receiving radar signals comprising:
   a high band radiator array disposed on a dielectric layer for transmitting and receiving high band radar signals;
   a low band radiator array disposed on a front side of the high band radiator array for transmitting and receiving low band radar signals;
   a frequency selective surface (FSS) tuned to the high band radar signals forming a surface of the low band radiator array that passes the high band radar signals to the high band radiator array; and
   a single aperture disposed in front of the low band radiator array, the high band radiator array and the FSS for both the low band radiator array and the high band radiator array for transmitting and receiving the radar signals, wherein
   the low band radiator array includes a plurality of tuning stubs tuned to high band frequencies to make the low band radiator array transparent to the high band radiator array.

2. The dual band frequency selective radiator array of claim 1, wherein the FSS is disposed on the front surface of the low band radiator array.

3. The dual band frequency selective radiator array of claim 1, wherein the high band radiator array is an array of patched high band radiators.

4. The dual band frequency selective radiator array of claim 1, wherein the low band radiator array is an array of patch low band radiators.

5. A dual band frequency selective radiator array for transmitting and receiving radar signals comprising:
   a high band radiator array disposed on a dielectric layer for transmitting and receiving high band radar signals;
   a low band radiator array disposed on a front side of the high band radiator array for transmitting and receiving low band radar signals;
   a frequency selective surface (FSS) tuned to the high band radar signals forming a surface of the low band radiator array and passes the high band radar signals to the high band radiator array;
   a single aperture disposed in front of the low band radiator array, the high band radiator array and the FSS for both the low band radiator array and the high band radiator array for transmitting and receiving the radar signals; and
   a plurality of support ribs to provide support and excitation for the low band radiator array.

6. The dual band frequency selective radiator array of claim 5, wherein one or more of the support ribs accommodate wires therein to provide current to drive the low band radiator array.

7. The dual band frequency selective radiator array of claim 5, wherein the support ribs include chokes tuned to high band frequencies to make the support ribs transparent to the high band radiator array.

8. The dual band frequency selective radiator array of claim 5, wherein the chokes are alternating and each alternate choke is a mirror image of its adjacent choke.

9. The dual band frequency selective radiator array of claim 1, further comprising a foam formed in a space between the low band radiator array and the high band radiator array to provide a support structure.

10. The dual band frequency selective radiator array of claim 1, wherein the low band radiator array comprises:
    top radiator metal patches formed and spaced apart on a dielectric substrate;
    bottom radiator metal patches formed and spaced apart on the dielectric substrate; and
    a metal ground plane including openings formed in the dielectric substrate, wherein a spacing of the top radiator patches and a spacing of the bottom radiator patches are aligned with each other, and wherein each opening covers entire spacings of corresponding top and bottom radiator patches.

11. The dual band frequency selective radiator array of claim 1, wherein the FSS behaves as a metal film at low band frequencies so that the low band radiators do not interfere with high frequency transmit or receive radar signals.

\* \* \* \* \*